Aug. 15, 1933.  E. POPPE  1,922,778
BRAKE
Filed June 1, 1931  3 Sheets-Sheet 1

Inventor
Erling Poppe
by Mawkinney & Mawkinney
Attorneys.

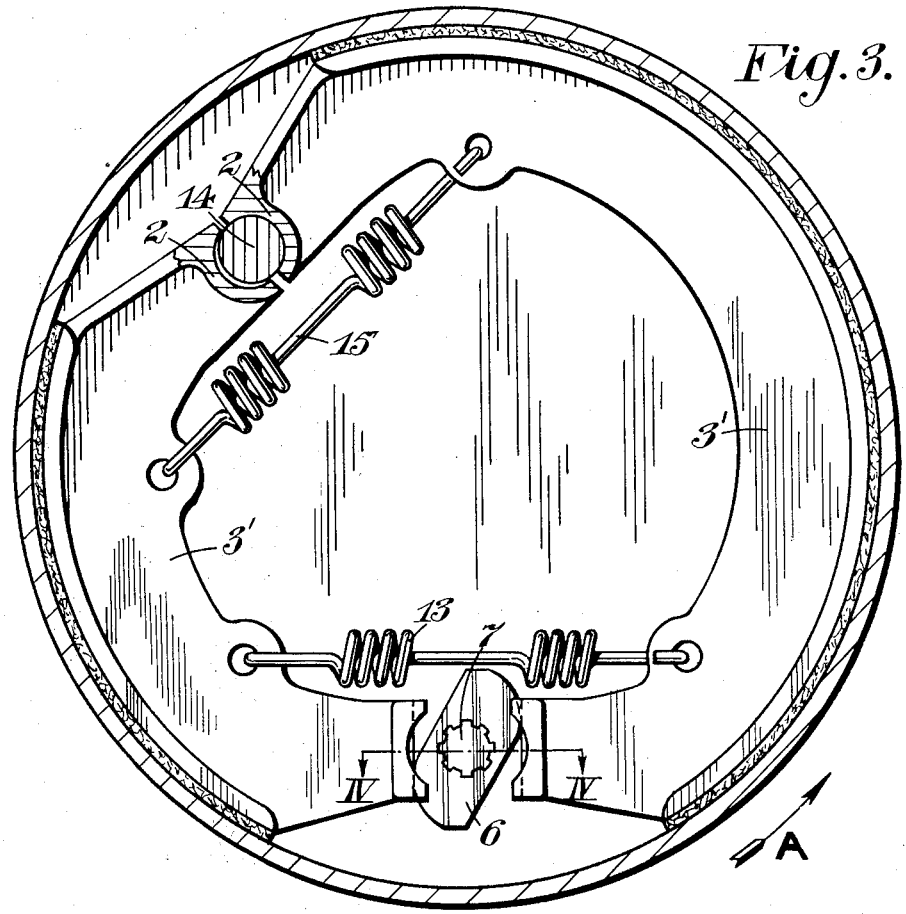
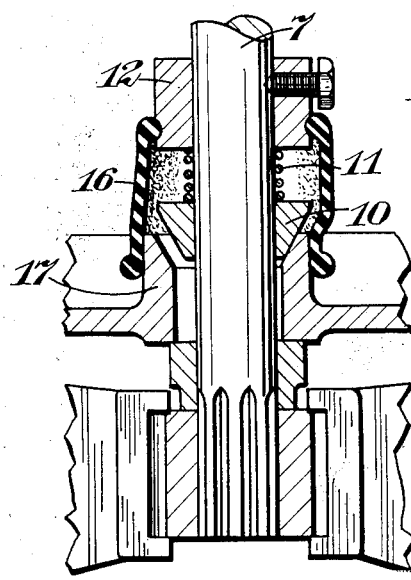

Aug. 15, 1933.  E. POPPE  1,922,778
BRAKE
Filed June 1, 1931  3 Sheets-Sheet 3

Inventor
Erling Poppe
by Mawhinney & Mawhinney
Attorneys.

Patented Aug. 15, 1933

1,922,778

UNITED STATES PATENT OFFICE 1,922,778

BRAKE

Erling Poppe, Shalford, England

Application June 1, 1931, Serial No. 541,508, and in Great Britain March 10, 1931

2 Claims. (Cl. 188—78)

This invention relates to internal-expanding brakes, and particularly to the kind including shoes which are pivoted at one end and actuated by means of a floating expander disposed between the opposite ends, although not limited in this respect. The main object of the invention is to provide an improved construction which will be very efficient.

According to this invention, the spindle of the expander is floatingly supported from the anchor plate or the equivalent. By this means full use can be made of the servo action of the shoes or like internal-expanding element, and it is therefore possible for the same to be freely centralized in the drum when in the off position.

According to a further feature of the invention, the expander is biassed to a predetermined position by means independent of any brake return spring. By this means the shoe or other friction element is given a definite off position.

In a preferred arrangement according to the invention, the expander is fixed to an actuating spindle which extends with clearance through the anchor plate or the equivalent from which it is supported by coacting spring-controlled wedge means slidably mounted on the spindle.

Figure 1:
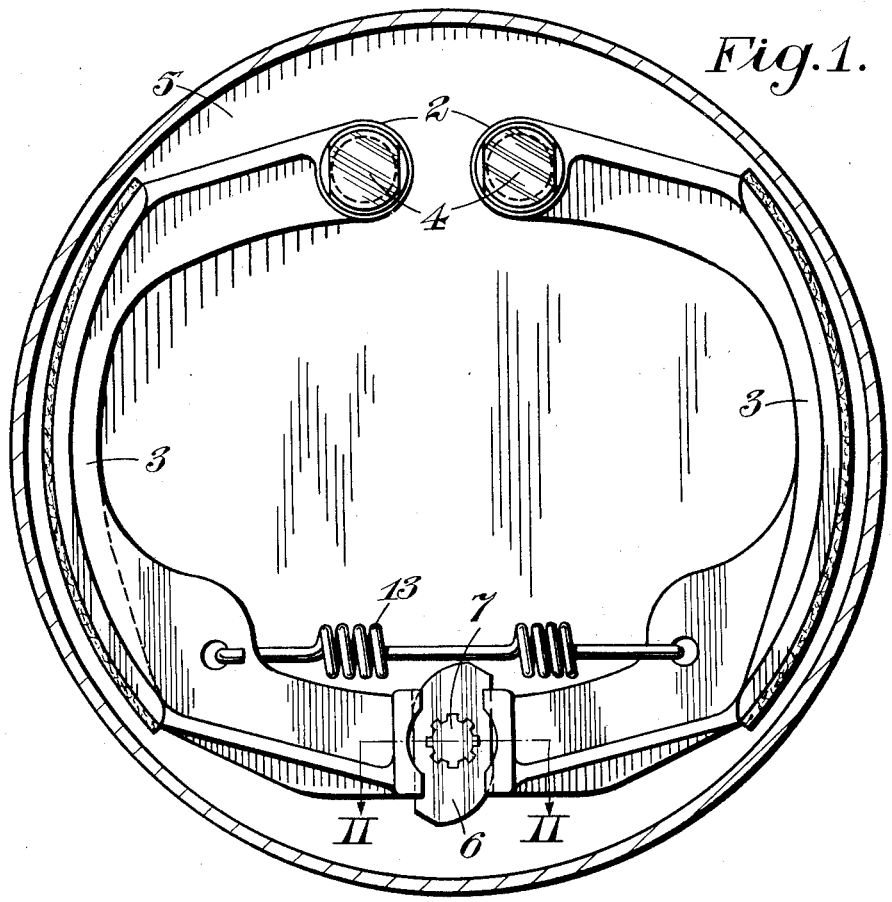
Figure 2:
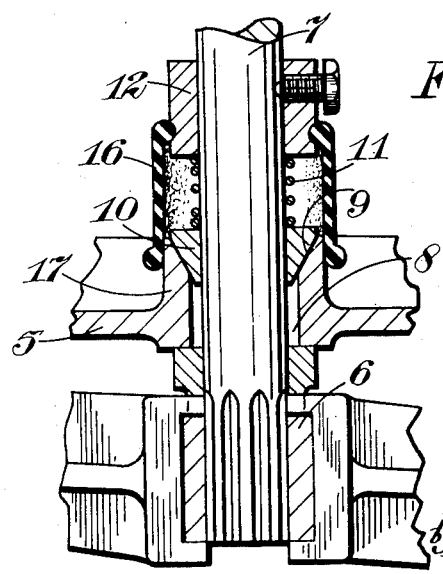
Figure 5:
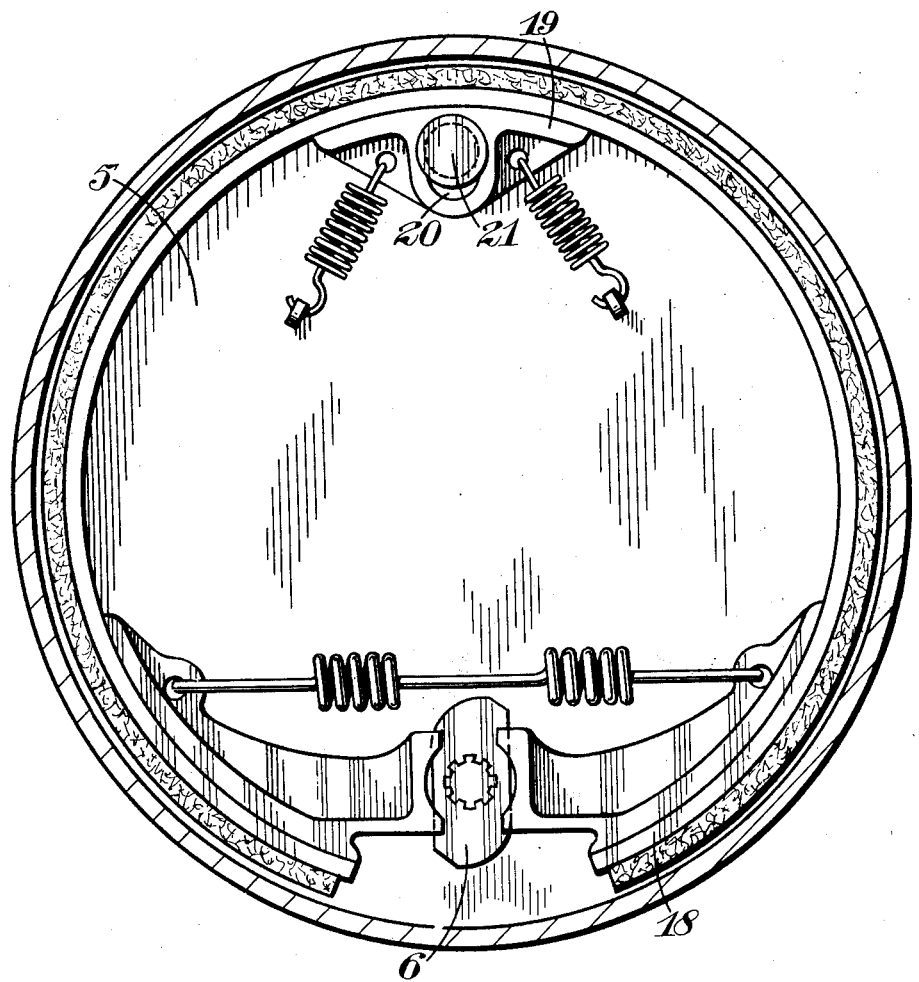

In the accompanying drawings,

Figure 1 is a section through a brake drum showing the application of the invention to a brake having expanding shoes pivotally anchored at one end, Figure 2 is a section to a larger scale on the line II—II of Figure 1, Figure 3 is a view similar to Figure 1 showing the invention applied to a brake in which the shoes are pivotally located but not anchored at one end, the shoes being shown in the "on" position, Figure 4 is a section, to a larger scale, on the line IV—IV of Figure 3, and Figure 5 is a view similar to Figures 1 and 3 showing the invention applied to a brake having an internally-expanding band.

Like numerals indicate like parts throughout the drawings.

In the construction shown in Figure 1, the corresponding ends 2, 2 of the shoes 3, 3 are mounted on pins 4, 4 fixed in an anchor plate 5. Between the opposite ends of the shoes is a cam 6 fixed on a spindle 7 extending through a clearance hole 8 in the anchor plate 5. This hole is outwardly bevelled at 9, and on the cam spindle 7 is mounted, free to slide, a wedge member in the form of a cone-shaped collar 10 of the same surface inclination as the bevelled part 9 of the hole 8. A compression spring 11 is located on the spindle 7 between the outer face of the wedge member 10 and an abutment 12, the spring acting to thrust the wedge member into engagement with the co-operating bevelled part of the hole 8.

The two shoes are normally biassed to an "off" position by the usual return-spring 13 extending between and connected to the shoes.

In the modified brake as shown in Figure 3, the shoes 3', 3' instead of being anchored at their ends 2, 2, are pivotally located about a pivot pin 14 so that when the brakes are applied the servo action of one of the shoes is transmitted to the other shoe through the floating expander. This will be clear from Figure 3, where the brakes are shown applied, the rotation of the brake drum being in the direction of the arrow A. In this arrangement a further spring 15 is used near the shoe ends 2 which acts to maintain these in contact with the pin 14 in the "off" position. The shoe operating means shown in Figure 4 is similar to that shown in Figure 2, the only difference in these figures being the relative disposition of the various parts in the "on" and "off" positions of the brakes.

In order to protect the centralizing means for the cam spindle from mud or the like a flexible sleeve 16 is supported at one end by the boss 17 on the anchor plate and at the opposite end by the abutment 12, and means may be provided for introducing lubricant into the sleeve.

In Figure 5, the cam 6 acts between the free ends of a band 18 carrying the friction material and rotation of the band is prevented by providing it with a bracket 19 having a radially slotted hole 20 which engages a locating pin 21 fixed to the anchor plate 5.

When the brakes are off (Figure 2) the wedge member 10 is forced by the compression spring 11 into the bevelled part 9 of the bore 8 so that the cam spindle 7 is centralized therein. When the brake is applied (Figure 4) the spindle and cam can float so that the loads on the two cam faces will tend to become equalized, the wedge member 10 in this operation travelling along the cam spindle and up the bevelled part 9 against the action of the spring 11.

By the invention, therefore, the efficiency of the brake over a similar brake actuated by a non-floating spindle and cam is greatly increased and the rotational friction of the spindle carrying the cam is small when the brake is applied. The arrangement functions in the same manner for rotation of the brake drum in both directions and ensures a definite normal or "off" position for the shoes or band.

What I claim as my invention and desire to secure by Letters Patent of the United States is:—

1. A brake actuator for brakes having expanding brake shoes and an anchor plate therefor, comprising an outwardly extending boss on the anchor plate with a clearance opening therethrough, a spindle mounted loosely through the clearance opening in the boss, a cam mounted on the inner end of the spindle between said brake shoes, said boss having an outwardly beveled outer end, a cone collar slidable on the spindle and engaging the outwardly beveled end of the boss, a spring carried by the spindle outwardly of said collar, an adjustable abutment mounted on the spindle to tension the spring against the collar to normally center the same in the boss, and a flexible sleeve enclosing said spring and collar and engaging at opposite ends over said boss and abutment.

2. In a brake, an anchor plate, brake shoes on the inner side of the anchor plate, a spindle mounted through the anchor plate, a cam on the inner end of the spindle between said shoes, said anchor plate having a clearance opening therethrough about the spindle and provided with an outwardly projecting boss at the marginal edge of the opening, said boss having an outwardly beveled outer end, a cone collar slidable on the spindle engaging in the outer end of the boss, a compression spring mounted on the end of the spindle with one end bearing against the outer side of the collar, an abutment adjustably mounted on the spindle beyond the spring and adapted for adjustment on the spindle to compress said spring with the desired pressure against said collar, and a flexible enclosing sleeve secured at opposite ends upon said boss and said abutment for enclosing the spring and adapted to flex during movements of said spindle and abutment eccentrically from the axis of said clearance opening.

ERLING POPPE.